US010096110B2

(12) United States Patent
Mouton et al.

(10) Patent No.: US 10,096,110 B2
(45) Date of Patent: Oct. 9, 2018

(54) SYSTEM AND METHOD FOR AUTOMATED STEREOLOGY OF CANCER

(71) Applicants: University of South Florida, Tampa, FL (US); Stereology Resource Center, Inc., Chester, MD (US)

(72) Inventors: Peter Randolph Mouton, St. Petersburg, FL (US); Dmitry Goldgof, Lutz, FL (US); Lawrence O. Hall, Tampa, FL (US); Baishali Chaudhury, Tampa, FL (US)

(73) Assignees: University of South Florida, Tampa, FL (US); Stereology Resource Center, Inc., Chester, MD (US)

( * ) Notice: Subject to any disclaimer, the term of this patent is extended or adjusted under 35 U.S.C. 154(b) by 0 days.

(21) Appl. No.: 15/503,183

(22) PCT Filed: Aug. 24, 2015

(86) PCT No.: PCT/US2015/046550
§ 371 (c)(1),
(2) Date: Feb. 10, 2017

(87) PCT Pub. No.: WO2016/029208
PCT Pub. Date: Feb. 25, 2016

(65) Prior Publication Data
US 2017/0236278 A1    Aug. 17, 2017

Related U.S. Application Data

(60) Provisional application No. 62/040,748, filed on Aug. 22, 2014.

(51) Int. Cl.
*G06K 9/00* (2006.01)
*G06T 7/00* (2017.01)
(Continued)

(52) U.S. Cl.
CPC .......... *G06T 7/0012* (2013.01); *G06K 9/0014* (2013.01); *G06K 9/38* (2013.01);
(Continued)

(58) Field of Classification Search
CPC ....... G06T 7/0012; G06T 7/11; G06T 3/4038; G06T 5/50; G06T 11/60;
(Continued)

(56) References Cited

U.S. PATENT DOCUMENTS 6,901,168 B1   5/2005 Gardes et al.
7,805,183 B2 * 9/2010 Keely .................. A61B 5/0091
                                                 356/300
(Continued)

OTHER PUBLICATIONS

Phoulady, Hady Ahmady et al., "Experiments with large ensembles for segmentation and classification of cervical cancer biopsy images", 2014 IEEE International Conference on Systems, Man and Cybernetics (SMC), IEEE, Jan. 2014, Retrieved Oct. 22, 2015 (Oct. 22, 2015) from Google Scholar, 7 pages.
(Continued)

*Primary Examiner* — Amir Alavi
(74) *Attorney, Agent, or Firm* — Michael Best & Friedrich LLP

(57) ABSTRACT

This invention relates to a system and method for applying an ensemble of segmentations to microscopy images of a tissue sample to determine if the tissue sample is representative of cancerous tissue. The ensemble of segmentations is applied to a plurality of greyscale or color microscopy images to generate a final image level segmentation and a final blob level segmentation. The final image level segmentation and final blob level segmentation are used to calculate a mean nuclear volume to determine if the tissue sample is representative of cancerous tissue.

20 Claims, 7 Drawing Sheets

(51) Int. Cl.
*G06K 9/38* (2006.01)
*G06K 9/62* (2006.01)
*G06T 7/11* (2017.01)
*G06T 7/155* (2017.01)
*G06T 7/136* (2017.01)

(52) U.S. Cl.
CPC ............... *G06K 9/629* (2013.01); *G06T 7/11* (2017.01); *G06T 7/136* (2017.01); *G06T 7/155* (2017.01); *G06T 2207/10056* (2013.01); *G06T 2207/30024* (2013.01); *G06T 2207/30096* (2013.01)

(58) Field of Classification Search
CPC . G06T 2207/30096; G06T 2207/30024; G06T 2207/10056; H04N 1/3876; H04N 5/23238; G06K 9/0014
See application file for complete search history.

(56) References Cited

U.S. PATENT DOCUMENTS

| | | | | |
|---|---|---|---|---|
| 9,740,912 B2* | 8/2017 | Schoenmeyer | ...... | G06K 9/0014 |
| 9,754,152 B2* | 9/2017 | Ajemba | ................... | G06T 7/155 |
| 9,779,499 B2* | 10/2017 | Athelogou | ............ | G06T 7/0012 |
| 2001/0053758 A1 | 12/2001 | Massaro et al. | | |
| 2005/0032132 A1* | 2/2005 | Niki | .................... | C07K 16/3015 435/7.23 |
| 2005/0037061 A1* | 2/2005 | Hosokawa | ....... | A61K 47/48615 424/450 |
| 2009/0208102 A1 | 8/2009 | Watanabe | | |
| 2010/0312072 A1* | 12/2010 | Breskin | ................ | A61B 6/4057 600/300 |
| 2011/0262920 A1* | 10/2011 | Yen | ...................... | C12Q 1/6886 435/6.12 |
| 2011/0274340 A1* | 11/2011 | Suzuki | .................. | G06T 7/0012 382/133 |
| 2017/0236278 A1* | 8/2017 | Mouton | ................ | G06T 7/0012 382/128 |

OTHER PUBLICATIONS

International Search Report and Written Opinion for International Application No. PCT/US2015/046550, dated Jan. 11, 2016, 8 pages.

* cited by examiner

SYSTEM AND METHOD FOR AUTOMATED STEREOLOGY OF CANCER

CROSS-REFERENCE TO RELATED APPLICATIONS

This application is a 371 application of International Application No. PCT/US2015/046550 filed on Aug. 24, 2015, which claims priority to U.S. Provisional Patent Application No. 62/040,748 filed on Aug. 22, 2014 and entitled "System and Method for Automated Stereology of Cancer", both of which are herein incorporated by reference in their entirety.

STATEMENT OF GOVERNMENT INTEREST

This invention was made with government support under Grant Number R44 MH076541 awarded by National Institutes of Health. The government has certain rights in the invention.

BACKGROUND OF THE INVENTION

A subjective analysis of stained tissue sections is a critical step in the detection and diagnosis of most cancer in developed countries. To help differentiate cancerous from normal tissue in these decisions, stereological parameters exist to quantify mean nuclear size and 3-D patterns of clustering and anisotropy. In manual (non-automated) form, however, these labor-intensive and tedious methods are prohibitive for broad clinical applications. Automatic quantification of these parameters requires segmentation, which is complicated by variations in the staining characteristics of cancerous and normal tissue, as well as within and between sections from the same tissue.

Accordingly, there is a need in the art for a system and method that reduces the time and cost for a trained expert to manually identify possible cases of cervical and other forms of cancer based on stained tissue sections from Pap smears and cervical biopsies.

SUMMARY OF INVENTION

Stereological procedures to quantify mean nuclear volume are commonly used to differentiate cancerous tissue from normal tissue. Automatic quantification of these parameters requires segmentation, which is complicated by the variability in tissue staining and nuclei size. One solution to deal with such alterations in a robust fashion is to use an ensemble of segmentation methods. In the present invention, an ensemble of simple segmentors is utilized in a novel way to improve the performance achieved by the individual segmentors.

In accordance with one embodiment of the present invention, a method for determining if a tissue sample is representative of cancerous tissue includes applying an ensemble of segmentations to a plurality of greyscale images to generate a set of segmented images for each of the plurality of greyscale images. The method further includes, determining if a segmented image of the set of segmented images comprises a blob that is larger than a predetermined maximum blob size, and rejecting the set of segmented images if a segmented image of the set of segmented images comprises a blob that is larger than a predetermined maximum blob size. Following the rejection of sets of segmented images that comprise a blob that is larger than a predetermined maximum blob size, the method continues by determining if at least half of the segmented images of the set of segmented images are similar, rejecting the set of segmented images if at least half of the segmented images of the set of segmented images are not similar and accepting the set of segmented images if at least half of the segmented images of the set of segmented images are similar to generate a set of accepted image level segmented images. The method further includes, determining if a blob is present in at least half of the segmented images of the set of segmented images, rejecting the set of segmented images if the blob is not present in at least half of the segmented images of the set of segmented images and accepting the set of segmented images if the blob is present in at least half of the segmented images of the set of segmented images to generate a set of accepted blob level segmented images. After the accepted image level segmented images and the accepted blob level segmented images have been determined, the method continues by combining the segmented images of the set of accepted image level segmented images using a consensus function to generate a final image level segmentation and a final blob level segmentation and calculating the mean nuclear volume of the final image level segmentation and the final blob level segmentation to determine if the tissue sample is representative of cancerous tissue.

In an additional embodiment, the method may further include receiving a plurality of color microscopy images of at least one stained tissue sample and converting the plurality of color microscopy images to the plurality of greyscale microscopy images.

The method may additionally include performing, prior to applying the ensemble of segmentations to the plurality of greyscale images, screening of each of the plurality of greyscale images to determine if the pixel intensity of each of the plurality of greyscale images is acceptable and rejecting the greyscale images if the pixel intensity of the greyscale image is not acceptable.

In general, the method of the present invention includes, applying an ensemble on the blob level in addition to the image level, utilizing the image level ensemble to accept or reject input images based on their segmentation quality and finally applying the ensembles for discriminating cancer and normal classes.

As such, the present invention provides a system and method that reduces the time and cost for a trained expert to manually identify possible cases of cervical and other forms of cancer based on stained tissue sections from Pap smears and cervical biopsies.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
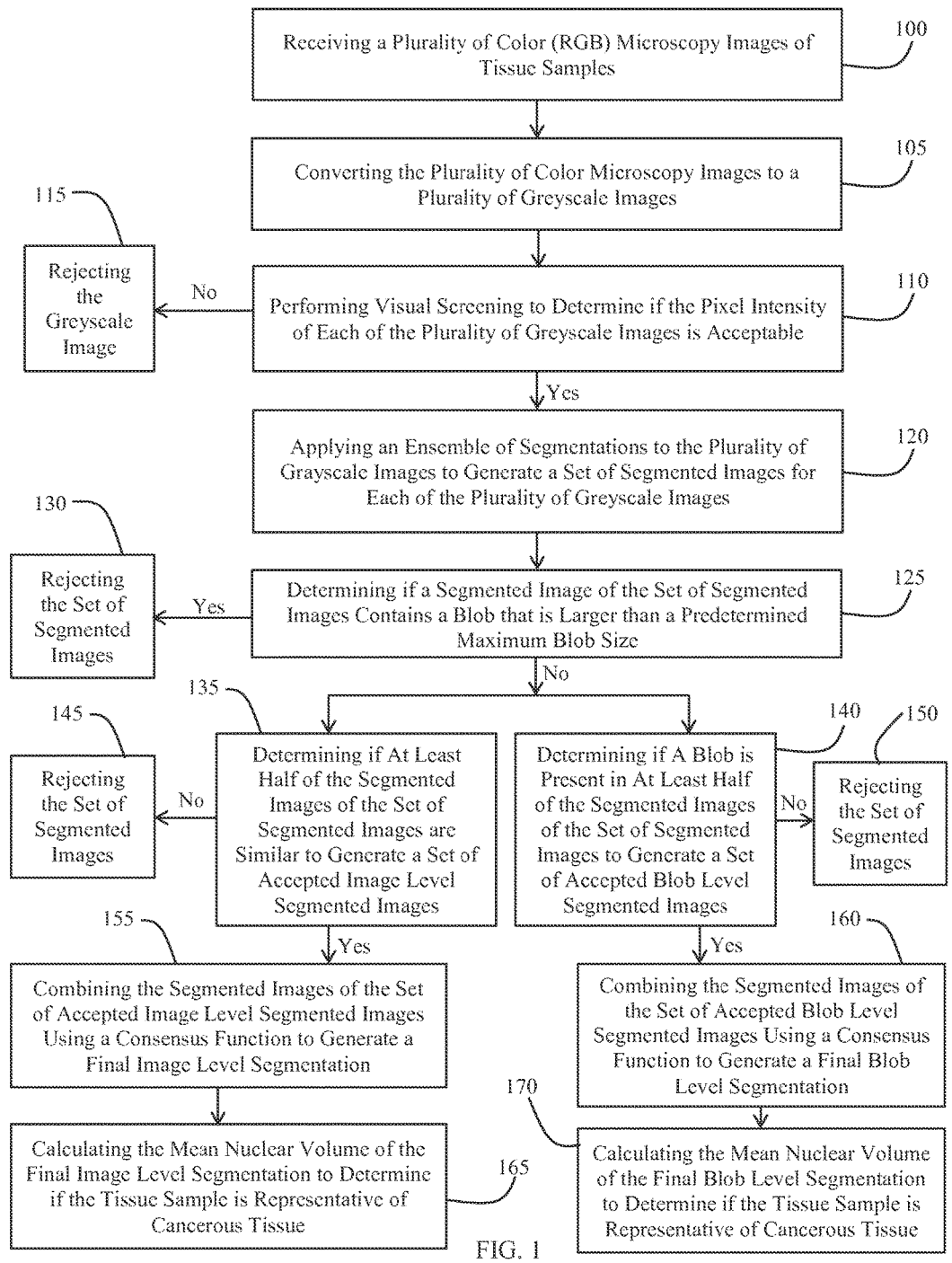
FIG. 1 is a flow diagram illustrating the ensemble framework in accordance with an embodiment of the present invention.

Subjective examination of tissue and cytology specimens by experts remains the current approach for the diagnosis, treatment and prognostic assessment of many cancers, including cervical cancer. However, commonly employed approaches suffer from poor inter-rater reliability, rater fatigue, and the morbidity associated with false negatives and false positives. Unbiased stereological approaches, involving three-dimensional interpretation of two-dimensional cross-sections of tissues, have the potential to strongly enhance expert-based clinical decisions with accurate assessments of first-order (number, length, surface area, volume) and second-order (spatial distribution, clustering, anisotropy) parameters. However, automatic stereological quantification requires an initial first segmentation step applied to a sufficient number of images from cancer and normal tissue to reveal biological differences, if present.

In the case of cervical cancer, the challenges of tissue segmentation stem from a variety of well-known factors, including high variability between microscopy images, uneven background intensity, staining variations within the cells and the existence of clustered cell nuclei. Overcoming such variation in biological images is not achievable using one segmentation method with a fixed parameter setting since the accuracy of segmentation algorithms varies according to the image content, which requires a specific ad-hoc tuning of parameters to produce optimal segmentation. In order to deal with this variation in a robust fashion, recent developments in segmentation favor an ensemble approach, wherein multiple segmentors are used rather than a single segmentation algorithm. The ensemble approach combines the results from different segmentation algorithms based on an a priori consensus function, with the final result typically superior to the results from any one of the individual segmentations. The ensemble of segmentations may use different algorithms altogether, or the same algorithms may be used with different parameter settings. Other ensembles such as feature-based and sampling-based ensembles have also been suggested.

The most effective ensemble of segmentations includes a diverse array of individual segmentation algorithms, novelty and accuracy in terms of the final segmentation result, and sufficient stability and robustness to handle small variations in input images. Finally, a critically important final step involves the selection of a consensus function to combine the multiple segmentations. A range of consensus functions can be used to compare the implemented segmentation methods and fuse them in the most effective manner, such as normalized mutual information among segmented images, bipartite graph approaches, feature based approaches, median concept, and averaging, to name just a few. Examples of consensus functions include shape-based averaging to combine different segmentations and an averaging algorithm based on integer linear programming.

In the present invention, an ensemble of segmentations is applied to microscopy images from cervical cancer and normal tissue. The approach uses a simple ensemble created by applying three-class Otsu followed by morphological operations. Although previous studies indicate that an ensemble of segmentations works mainly for parameter tuning and optimal algorithm search for a particular application, the present invention utilizes the approach for a novel application.

With the advancement in microscopy image acquisition, large numbers of images may be acquired in a short amount of time and at a minimal cost. Not all segmentation algorithms provide good results, which can hamper the final quantitative analysis of the tissue samples. Hence, in the present invention, the ensemble of segmentations is used to accept or reject images based upon the segmentation quality of the images. Since the final analysis is based on stereological estimates, it is sufficient to use a subset of images for quantitative analysis. Finally, previous studies in the literature focused on applying segmentation ensembles at an image level. Again, as the final goal is to make unbiased estimates of a first-order stereology parameter (mean nuclear volume) for segmented nuclei from normal and cancer tissue, the ensemble of segmentations of the present invention was applied per segmented blob (nucleus) in addition to image level ensemble.

The ensemble framework, in accordance with an embodiment of the present invention, has two main parts: (1) ensemble components i.e. individual segmentation methods and (2) the application of the ensemble at two different levels, the image level and the blob level. The method of the present invention begins with a first level of image screening of the input images based on pixel intensity, followed by image segmentation using individual segmentations and then a second level of image screening of the segmented images that is based on the size of the largest segmented nuclei, which is referred to as a "blob". As such, the method of the present invention can be divided into two independent levels of ensemble, an image level and a blob level. As mentioned earlier the image level ensemble is being utilized to accept or reject images based upon the similarities among the segmentations. For the accepted images, the multiple segmentations are then combined to generate the final image level segmentation. At the blob level ensemble, the final segmentation is generated by accepting or rejecting the blobs from all the segmentations to produce the final blob level segmentation. The final set of segmented blobs from both the image level ensemble and the blob level ensemble is then used independently for mean nuclear line length calculation to discriminate between cancer and normal cases.

Otsu thresholding is widely used in low level segmentation algorithms in microscopy image segmentation. These segmentation methods are generally followed by some post processing step to refine the results.

With reference to FIG. 1, in one embodiment of the present invention, the method includes receiving a plurality of color (RGB) microscopy images 100 and converting the plurality of color microscopy images to a plurality of greyscale images 105. In a particular embodiment, the RGG images are converted to greyscale images using a Karhunen-Loeve transform. The greyscale image transformation is followed by performing a visual screening to determine if the pixel intensity of each of the plurality of greyscale images is acceptable 110. If the pixel intensity of each the greyscale image is not acceptable, the greyscale image is rejected 115. The method then continues with the accepted images by applying an ensemble of segmentations to the plurality of greyscale images to generate a set of segmented images for each of the plurality of greyscale images 120. In a particular embodiment, a three-class (nuclei, cytoplasm and background) Otsu thresholding is applied in the ensemble of segmentations, which works to minimize the intra-class variance and maximize the inter-class variance, to detect objects of interest. In this particular embodiment, after applying the three-class Otsu threshold algorithm on the greyscale images, the class of pixels whose original average color is closest to the target color is selected as the foreground and the rest as background pixels. The target color is determined by the observed stain and must be adjusted if the stain is changed. This is followed by morphological operations including open, dilation, and fill hole, as the post processing steps. Dilation is used to expand the foreground pixels using a structuring element. Opening is the morphological operation which is the dilation of an eroded binary image and tends to remove small objects from the foreground. Fill hole (a Matlab function) is used for replacing a set of background pixels (enclosed by a set of foreground pixels) with foreground pixels, i.e. it removes the interior holes in the binary image. Different combinations of Otsu and the morphological operations form the individual segmentors in the ensemble. The four exemplary individual segmentors are listed below:

Segmentor 1: Begins with three-class Otsu thresholding which generates a binary image, followed by morphological opening operation and then finally, filling the interior holes.

Segmentor 2: Following the $1^{st}$ application of three-class Otsu, the farthest class (from the target color) is rejected, i.e. the pixels corresponding to that class are set to zero in the greyscale image. A three-class Otsu is again performed on the modified greyscale image, followed by a morphological opening operation and the filling of the interior holes.

Segmentor 3: Same as Segmentor 1, but with an additional step of edge detection performed after the morphological operations.

Segmentor 4: Begins with a three-class Otsu followed by edge detection. Dilation is then performed which is succeeded by filling the interior holes using fill hole operation.

Figure 2:
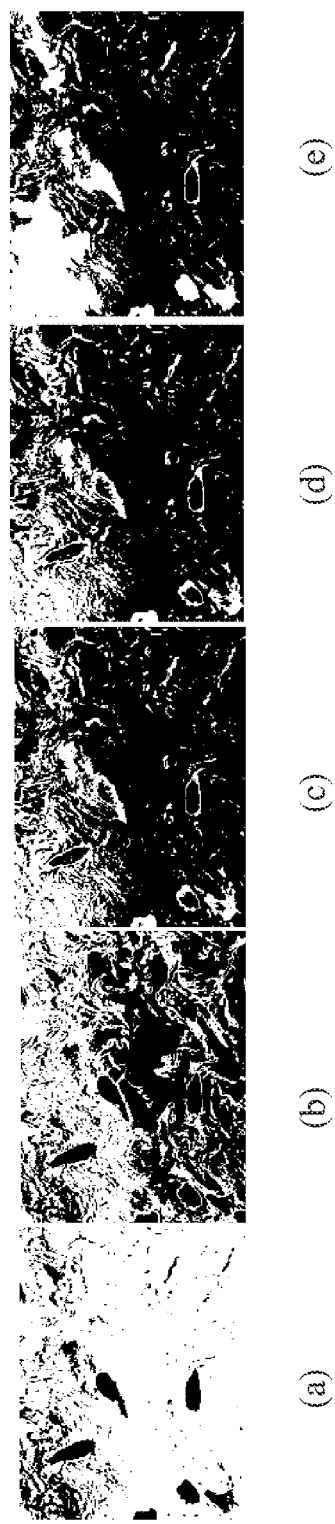
FIG. 2 is a diagrammatic illustration of the segmentor in accordance with an embodiment of the present invention illustrating: (a) greyscale image from KLT transform; (b) output after 1st iteration of Otsu; (c) output after 2nd iteration of Otsu; (d) output after morphological opening of (c); (e) fill hole operation on (d).

FIG. 2 illustrates the different steps of exemplary segmentor 2 in which is illustrated, (a) greyscale image from KLT transform; (b) output after $1^{st}$ iteration of Otsu; (c) output after $2^{nd}$ iteration of Otsu; (d) output after morphological opening of (c); (e) fill hole operation on (d).

In cancer tissues, the cancer cells are in the process of dividing their DNA to create daughter cells, whereas this process does not occur in normal cells. Hence, a cancer biopsy contains a mixture of normal as well as cancer cells, whereas normal tissue contains only normal cells. If the smaller normal nuclei (blobs) are retained, then the accuracy of the statistical analysis may be affected. In order to prevent this, a connected component analysis may be performed after each segmentation and the connected components (referred to as blobs henceforth) smaller than MinBlobSize may be removed. It was determined by observation that the cell size in both cancer and normal cases did not exceed a certain value—MaxBlobSize. As such, with reference to FIG. 1, the method includes determining if a segmented image of the set of segmented images contains a blob that is larger than a predetermined maximum blob size 125, and if a segmented image of the set of segmented does include a segmented image that contains a blob larger than a predetermined maximum blob size, the set of segmented images is rejected 130. So, if the maximum size of the segmented blob (taken over all of its four segmentation results) is more than the MaxBlobSize then it indicates a bad segmentation and hence the original image is discarded.

Again with reference to FIG. 1, at the image level, the method of the present invention continues by determining if at least half of the segmented images of the set of segmented images are similar to generate a set of accepted image level segmented images 135. If at least half of the segmented images of the set of segmented images are not similar, the set of segmented images is rejected 145. Additionally, at the blob level, the method includes determining if a blob is present in at least half of the segmented images of the set of segmented images to generate a set of accepted blob level segmented images 140. If a particular blob is not present in at least half of the segmented images of the set of segmented images, then the set of segmented images is rejected 150.

Figure 3:
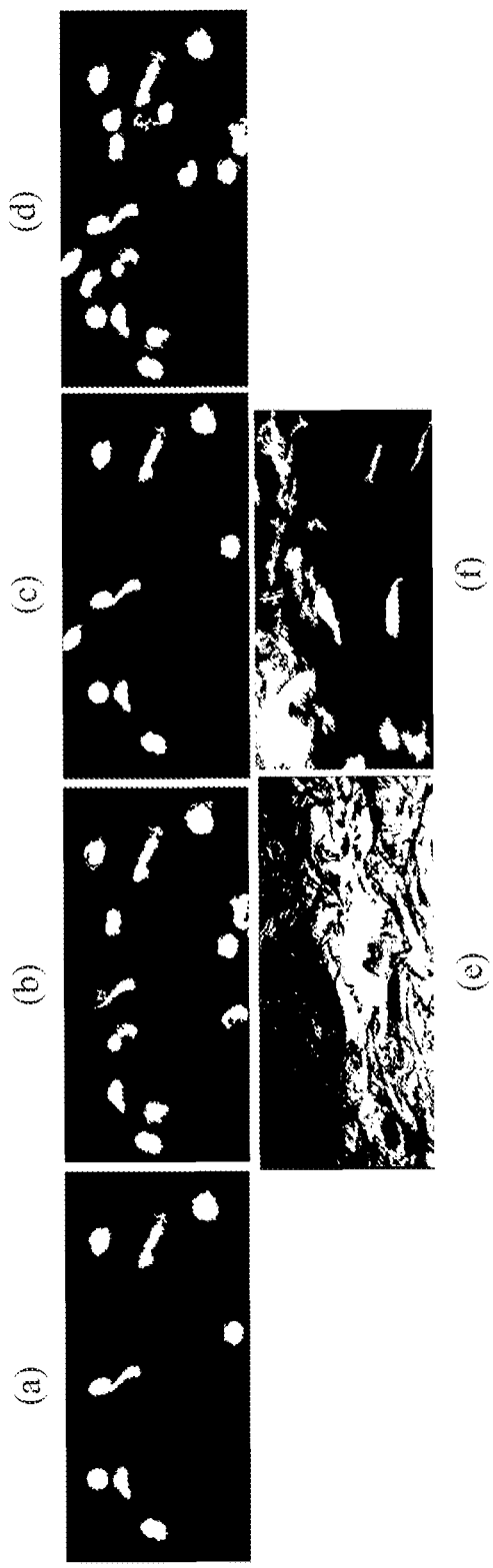
FIG. 3 is an illustration of a image rejection based upon an embodiment of the present invention, wherein the top-row illustrates an example of an image rejected because the individual segmentations don't satisfy the ImgSimThresh of 55% and the bottom-row illustrates an example of a image rejected based on segmentation of the maximum segmented blob size>MaxBlobSize (40000).

FIG. 3 is an illustration of a image rejection based upon an embodiment of the present invention, wherein the top-row illustrates an example of an image rejected because the individual segmentations (a)-(d) don't satisfy the ImgSimThresh of 55% and the bottom-row (e)-(f) illustrates an example of an image rejected based on segmentation of the maximum segmented blob size>MaxBlobSize (40000), in accordance with an exemplary embodiment of the present invention.

Following the generation of the accepted image level segmented images 135 and the accepted blob level segmented images 140, the method continues by combining the segmented images of the set of accepted image level segmented images using a consensus function to generate a final image level segmentation 155 and combining the segmented images of the set of accepted blob level segmented images using a consensus function to generate a final blob level segmentation 160. The consensus function is used to combine the results from individual segmentations to get the final result, which is the most important step in an ensemble framework. A literature survey shows that a number of evaluation methods can be used to compare and select the best segmentation results and this can be conducted at an image level or at a lower level, such as the segmented blob level. In the present invention, the ensemble is applied at both the image and the blob level. At the image level, the ensemble is also applied for image acceptance/rejection depending upon the segmentation quality of the images. While at the blob level, the final segmentation is generated by accepting and rejecting blobs. Both these approaches are individually explained in the following subsections.

The first step of the image level ensemble segmentation is to accept/reject the images and the second step of the image level ensemble segmentation is to combine the multiple segmentation results based on a consensus function for the accepted images to get the final segmentation. In a particular embodiment, the principle used to achieve the first step of the image level segmentation is based on the argument that a similarity among at least three of the total four individual segmentations (of a particular image), indicates a good and an acceptable segmentation and vice versa. In an additional embodiment, more than four individual segmentations could be used and in general, images will be accepted if more than have of the individual segmentations are determined to be similar. Two possible approaches may be used to calculate this similarity, to accept or reject images based on the similarity and to achieve the final segmentation from the ensemble.

The first step for both of the possible approaches is to consider all the combinations of the four segmentation methods taken three at a time.

Let the four individual segmentations be $S_1$, $S_2$, $S_3$ and $S_4$, The four combinations are $C_1(S_1, S_2, S_3)C_2(S_1, S_2, S_4), C_3(S_1, S_3, S_4)$ and $C_4(S_4, S_2, S_3)$ In the first ensemble approach, for each combination, a single similarity ratio is calculated taking the three segmentations one at a time. While in the second ensemble approach, for each combination, three similarity ratios are calculated between the three pairs of segmentations. The details of the approaches are given below.

In accordance with the first ensemble approach of the present invention, the steps include:

Step 1: Similarity among three segmentations $S_a$, $S_b$ and $S_c$ in a combination $C_k$—ThreeSimilarities ($C_k$) is calculated by the following formula and it is computed for all the four combinations($C_1$, $C_2$, $C_3$, $C_4$)

ThreeSimilarity($C_k$)=$|S_a \cap S_b \cap S_c|/|S_a \cup S_b \cup S_c|$

Step 2: The maximum value out of the four ThreeSimilarity values is selected—Max Step 3: If Max≥imgSimThresh, then accept the image, choose the corresponding combination, and conduct step 4, else, reject the image. Again, the top row of FIG. 3 illustrates an example of an image rejected through this criterion.

Step 4: For the selected combination $C_k$ (satisfying the above condition) get the pair-wise similarities between each of the three pairs of segmentations within that combination—PairSimilarity. It is calculated similar to ThreeSimilarity in step 1.

PairSimilarity($S_a S_b$)=$|S_a \cap S_b|/|S_a \cup S_b \cup S_c|$

Step 5: For each segmentation in the combination, get the average of the pair-wise similarities calculated between this and the other two segmentations—Avg. Select the segmentation which has the highest Avg value as the final segmentation.

Figure 4:
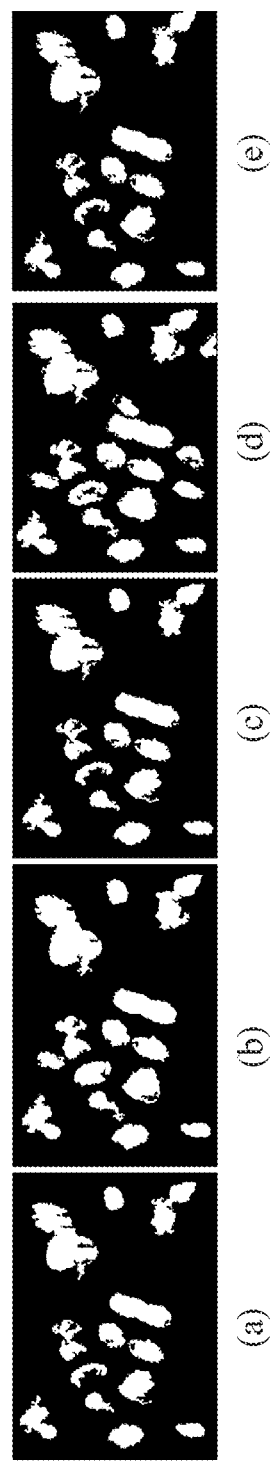
FIG. 4 is an illustration of the sample results in accordance with an embodiment of the present invention: (a)-(d) results from individual segmentors with ImgSimThresh 55% (e) result from ensemble 1.

FIG. 4 illustrates the results from the application of the first ensemble approach, wherein (a)-(d) are the results from individual segmentors with ImgSimThresh 55% and (e) is the result from ensemble 1.

In the second ensemble approach of the present invention, the steps include:

Step 1: For a combination $C_k$ get the pair-wise similarities between each of the three pairs of segmentations (as described in step 4 of the first approach), select the minimum pairwise similarity Min and calculate the average of the three similarities—AvgSim Step 2: Accept the image if Min (from all the four combinations)>imgSimThresh and choose the combination with maximum AvgSim.

Step 4: For the selected combination, the final segmentation is generated by taking the intersection of the three segmentations within that combination: $S_a \cap S_b \cap S_c$)

The present invention also utilizes the ensemble of segmentations at the blob level to reject or accept blobs within the segmented images. In a particular embodiment of the present invention, a blob in a particular segmentation is compared to other blobs in the other three segmentations using a colinearity criterion and an area overlap criterion described below.

Colinearity check: If the distance between the blob centroids<CentDist, then they are considered to represent the same nucleus.

Area overlap check: If the area overlap between two blobs>=BlobSimThresh then it is considered to represent the same nucleus.

For the exemplary embodiment, if the blob passes the above two checks for at least three segmentations, then the largest blob (from all the segmentations in which it appears) is retained or else it is discarded from the final segmentation.

Figure 5:
FIG. 5 is a diagrammatic view of examples of a blob level ensemble. (a)-(d) individual segmentations; (e) result from blob level ensemble in accordance with an embodiment of the present invention.

FIG. 5 is a diagrammatic view of examples of a blob level ensemble, wherein (a)-(d) are the individual segmentations and (e) is the result from a blob level ensemble, in accordance with an embodiment of the present invention.

Because the nuclei of many cancers are on average larger than nuclei from normal cells, mean nuclear volume (MNV) is often an important feature to discriminate between the cancer and normal classes. As such, with reference to FIG. 1, the method further includes, calculating the mean nuclear volume of the final image level segmentation to determine if the tissue sample is representative of a cancerous tissue 165 and calculating the mean nuclear volume of the final blob level segmentation to determine if the tissue sample is representative of cancerous tissue 170. In the present invention, stereological methods are applied to obtain MNV estimates for the segmented nuclei (blobs). Because a point-sampled intercept is automatically used to sample segmented nuclei for the MNV estimate, the estimator is termed volume-weighted mean nuclear volume (PSI-Vv). The three main steps involved for estimating PSI-Vv are placement of a point-grid for point sampled intercept (PSI) sampling; collection of line lengths (I) across sampled nuclei; and finally computation of PSI-Vv according to the formula given below.

$$V_V = \frac{\pi \sum_{i=1}^{N} l_i^3}{3N},$$

where $N$ = total number of *nuclei* sampled by *PSI* in the *ROI*

Figure 6:
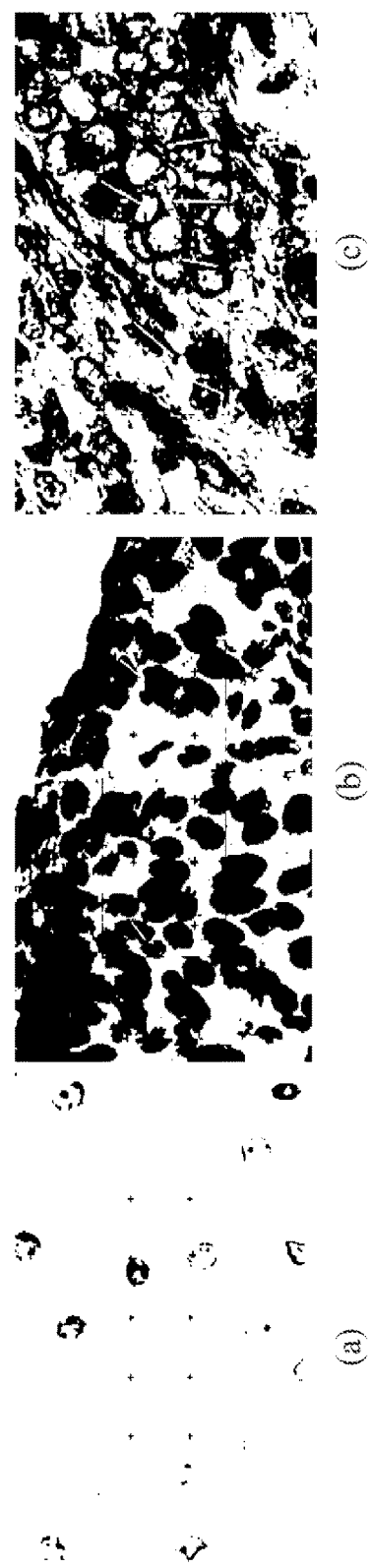
FIG. 6 is a diagrammatic view of the three different steps of feature extraction in accordance with an embodiment of the present invention.

FIG. 6 is a diagrammatic view of the three different steps of feature extraction in accordance with an embodiment of the present invention, including (a) placement of a point-grid for point sampled intercept (PSI) sampling, (b) collection of line lengths across sample nuclei and (c) computation of PSI-Vv.

In an exemplary embodiment of the present invention, data was acquired using an integrated hardware-software-microscope system (Stereologer, Stereology Resource Center, Inc. Tampa-St. Petersburg, Fla.). The system is comprised of a motorized X-Y-Z stage, which can be controlled either manually or automatically by the software, a bright field microscope Zeiss Axioskop 40 and a camera Optronics Microfire that captures images in 8 bits in three-channel (RGB) color. The source of the input was cervical cone biopsy tissue sectioned at 6 μm and stained with hematoxylin and eosin (H&E). Data was acquired by placing the tissue sample/biopsy slide with normal or cancer (squamous cell carcinoma) tissue under the microscope. For data acquisition the automatic XYZ stepping motor and Stereologer software were used to manually outline a region of interest (ROI) at low magnification. Within each ROI a minimum of 300 2-D images were captured over a single focal plane at 40×magnification.

Images were acquired from 29 individual biopsy slides/cases, 14 normal and 15 cancerous cases. The tissue was stained to enhance the signal to noise ratio (SNR) of cell nuclei, which are the objects of interest. Some of the cases were removed after a visual screening, as previously described with reference to method step 110 of FIG. 1, if they had either poor acquisition quality or were complicated images (images with a large number of overlapped cells or high variation in background intensity). For the final data collection, a total of 13 cases were used, 6 normal and 7 cancer case. There were a total of 4106 and 6145 images in normal and cancer case, respectively, with each having a resolution of 759×1138.

Figure 7:
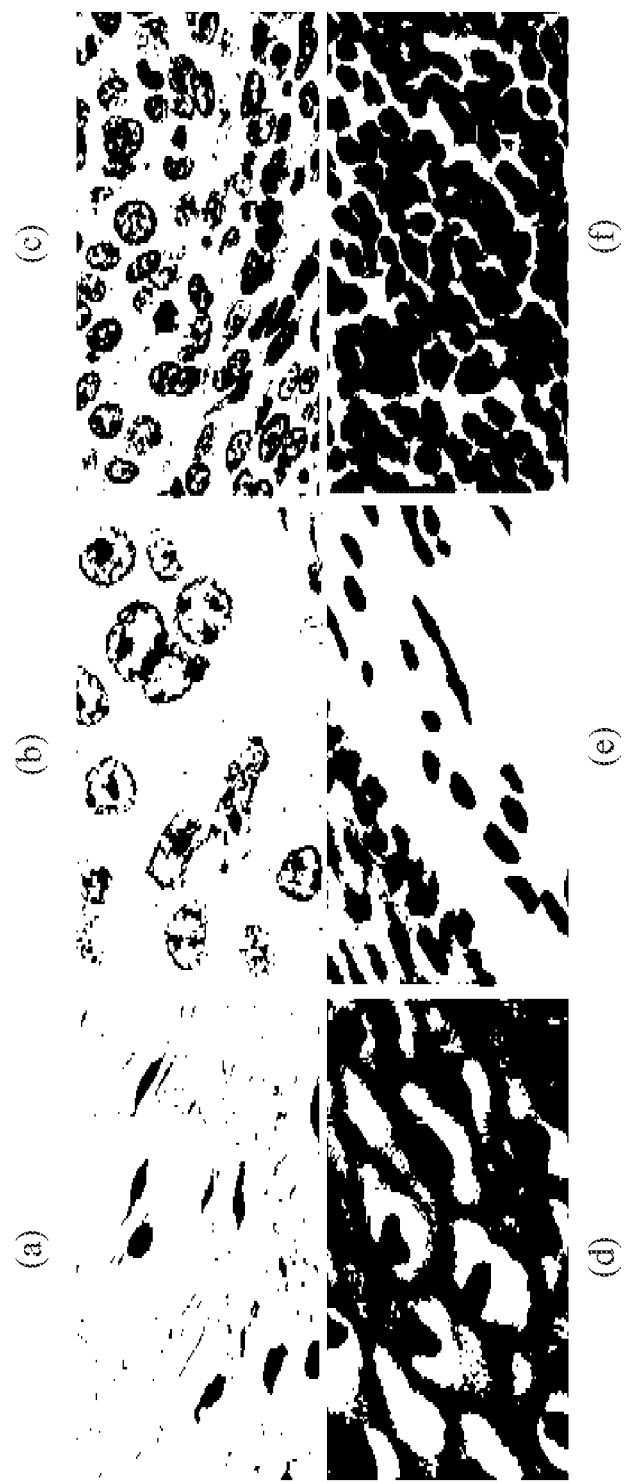
FIG. 7 is a diagrammatic view of examples of visually acceptable cases (top row); examples of visually unacceptable cases (bottom row): Left-blurry image, center-background variation within image, right-overcrowded image, in accordance with an embodiment of the present invention.

FIG. 7 is a diagrammatic view of examples of visually acceptable cases (a)-(c); and examples of visually unacceptable cases (d)-(f), wherein (d) is considered blurry image, (e) is considered to have background variation within image and (f) is considered to be an overcrowded image. The unacceptable images are rejected from further analysis.

Mean line lengths calculated from the segmented nuclei acquired from the ensembles were used to calculate the volume (PSI-Vv) as previously discussed. Through different experiments, having varying parameter settings, the potential of PSI-Vv to discriminate cancer from normal cases was explored. The degree of separability, S, between the two classes with means $\mu_1$ (for Normal class) and $\mu_2$ (for Cancer Class) and standard deviations $Stddev_1$ (Normal Class) and $Stddev_2$, (Cancer Class) were calculated using the following formula and used to compare different experiments. This degree of separability should be more than 0 for potential separation between two classes.

$$S=|\mu_1-\mu_2|-(Stddev_1+Stddev_2)$$

Since in the image level ensemble there is an additional image accept/reject stage unlike the non-ensemble case and the blob level ensemble, the total number of final segmented images generated from the image level ensemble (3612 normal and 4440 cancer images) varies from that generated through the later two scenarios (3910 normal and 4472 cancer images). Also, both image level ensembles accept/reject images in different ways and thus produce slightly different numbers of final segmented images.

The parameters used in the exemplary ensemble framework are listed in Table 1. Three of these parameters–imgSimThresh, MaxBlobSize and MinBlobSize were varied to conduct different sets of experiments. In the present exemplary embodiment, the parameter selection was performed manually. Although different sets of parameter values were used for experimentation, only two such sets were chosen for the image level ensemble to be reported here, as they probe some significant observations. For the blob level ensemble only one experiment is reported. The performance evaluation of both levels of ensembles is done by comparing theft degree of separability with that of the individual segmentations with the same parameter set.

For the first set of experiments the parameters ImgSimThresh, MaxBlobSize and MinBlobSize have the values of 65%, 80000 and 1000 (Table 2) and, in the second set of experiments their values were 55%, 40000 and 4000 (Table 3). At blob level ensemble the value of BlobSimThresh was set to 75%, while MaxBlobSize and MinBlobSize were set to 4000 and 40000 (Table 4). In all the sets of experiments it should be noted that the first parameter is not applicable for the individual segmentations, but instead is only applicable for the ensembles.

TABLE 1

Parameters and their values

| Step of Algorithm | Parameter (constant/variable) | Value(s) |
|---|---|---|
| Pixel intensity based image screening | Intensity threshold- IntThresh (constant) | 250 |
| Ensemble Components | Minimum blob size to reject small blobs - MinBlobSize (variable) | 1000, 4000 pixels |
| Segmentation based image screening | Maximum blob size to reject images - MaxBlobSize (variable) | 80000, 40000 pixels |
| Image level ensemble | Similarity threshold - ImgSimThresh (variable) | 65%, 55% |
| Blob level ensemble | Blob area overlap -BlobSimThresh (constant) | 75% (0.75) |
| Blob level ensemble | Distance between blob centroids - CentDist (constant) | 10 pixels |

TABLE 2

Image level ensemble: Summary table for parameters 65%, 80000, 1000

| Experiment | normal class $\mu_1$ | cancer class $\mu_2$ | normal class $Stddev_1$ | cancer class $Stddev_2$ | Class Separability Measure (S) |
|---|---|---|---|---|---|
| Seg 1 | 133.96 | 260.06 | 48.01 | 120 | −41.90 |
| Seg 2 | 166.36 | 357.63 | 49.30 | 190.92 | −48.96 |
| Seg 3 | 144.67 | 274.42 | 50.01 | 123.84 | −44.10 |
| Seg 4 | 194.48 | 400.12 | 66.22 | 195.4 | −55.98 |
| Ensemble 1 | 133.79 | 263.89 | 43.18 | 118.85 | −31.94 |
| Ensemble 2 | 131.03 | 274.5 | 39.38 | 138.9 | −34.80 |

TABLE 3

Image level ensemble: Summary table for parameters 55%, 40000, 4000

| Experiment | normal class $\mu_1$ | cancer class $\mu_2$ | normal class $Stddev_1$ | cancer class $Stddev_2$ | Class Separability Measure (S) |
|---|---|---|---|---|---|
| Seg 1 | 185.98 | 309.57 | 59.68 | 74.09 | −10.19 |
| Seg 2 | 220.63 | 388.28 | 53.85 | 120.40 | −6.61 |
| Seg 3 | 196.15 | 321.23 | 60.33 | 75.58 | −7.78 |
| Seg 4 | 233.58 | 382.86 | 50.94 | 94.019 | 4.32 |
| Ensemble 1 | 187.27 | 328.82 | 34.69 | 86.8377 | 20.02 |
| Ensemble 2 | 152.81 | 301.92 | 37.29 | 70.25 | 41.58 |

TABLE 4

Blob level ensemble: Summary table for parameters 75%, 40000, 4000

| Experiment | normal class $\mu_1$ | cancer class $\mu_2$ | normal class $Stddev_1$ | cancer class $Stddev_2$ | Class Separability Measure (S) |
|---|---|---|---|---|---|
| Seg 1 | 185.98 | 309.57 | 59.68 | 74.09 | −10.19 |
| Seg 2 | 220.63 | 388.28 | 53.85 | 120.40 | −6.61 |
| Seg 3 | 196.15 | 321.23 | 60.33 | 75.53 | −7.78 |
| Seg 4 | 233.58 | 382.86 | 50.94 | 94.02 | 4.32 |
| Blob ensemble | 174.43 | 283.87 | 34.04 | 67.29 | 8.11 |

In the first set of experiments, Table 2, the image level ensemble as wet as the individual segmentations resulted in a negative value for the class separability measure, thus indicating the inability to discriminate cancer cases from normal cases. However, the image level ensembles performed better than the individual segmentations. In the second set experiments shown in Table 3 and third set of experiments shown in Table 4, better results were obtained overall by increasing the value for MinBlobSize. This can be explained in the following manner. The algorithm and associated method of the present invention is designed to test the hypothesis that cancer nuclei will be on average larger than normal nuclei. To avoid diluting this effect in the cancer tissue, which has a mix of normal and cancer cells, the larger sized cells (>4000) are primarily sampled in sections from both normal and cancer tissue. The ensembles not only outperformed the individual segmentors, but are also able to discriminate cancer from normal class.

The present invention describes the application of an ensemble of segmentations for the analysis of microscopy images from cervical cancer and normal tissue. A simple ensemble of three-class Otsu thresholding followed by morphological operations is employed in the present invention. The ensemble approach was used for a novel application to accept and reject images based on their segmentation quality and in turn reduce the computation which may arise due to the automatic acquisition of a large number of images. The ensemble approach was not only applied at the image level but also at a lower, blob level. The final segmentations achieved through both the levels of segmentations were used to calculate mean nuclear line length and finally the volume-weighted mean nuclear volume (PSI-Vv) using unbiased stereological rules. A degree of class separability measure was calculated from the PSI-Vv values for each ensemble as well as the individual segmentations and was used for performance evaluation. Both image level ensembles and blob level ensembles gave better class separability values than the individual segmentations. By increasing the minimum blob size to 4000, the ensembles were able to separate nuclei of the normal cells from the cancer cells. The best results were given by ensemble approach from Table 2 with the parameter setting for ImgSimThresh, MaxBlobSie and MinBlobsize of 55%, 40000 and 4000 respectively, which resulted in a class separability measure of 41.58. Hence, demonstrating that the ensembles framework provided improved results over the individual segmentations.

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Python, MATLAB or the like and conventional procedural programming languages, such as the "C" programming language or similar programming languages, or assembly language.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method for determining if a tissue sample is representative of cancerous tissue, the method comprising:

applying an ensemble of segmentations to a plurality of greyscale images to generate a set of segmented images for each of the plurality of greyscale images;

determining if a segmented image of the set of segmented images comprises a blob that is larger than a predetermined maximum blob size, and rejecting the set of segmented images if a segmented image of the set of segmented images comprises a blob that is larger than a predetermined maximum blob size;

determining if at least half of the segmented images of the set of segmented images are similar, rejecting the set of segmented images if at least half of the segmented images of the set of segmented images are not similar and accepting the set of segmented images if at least half of the segmented images of the set of segmented images are similar to generate a set of accepted image level segmented images;

determining if a blob is present in at least half of the segmented images of the set of segmented images, rejecting the set of segmented images if the blob is not present in at least half of the segmented images of the set of segmented images and accepting the set of segmented images if the blob is present in at least half of the segmented images of the set of segmented images to generate a set of accepted blob level segmented images;

combining the segmented images of the set of accepted image level segmented images using a consensus function to generate a final image level segmentation;

combining the segmented images of the set of accepted blob level segmented images using a consensus function to generate a final blob level segmentation; and calculating the mean nuclear volume of the final image level segmentation and the final blob level segmentation to determine if the tissue sample is representative of cancerous tissue.

2. The method of claim 1, further comprising:
receiving a plurality of color microscopy images of at least one stained tissue sample; and
converting the plurality of color microscopy images to the plurality of greyscale microscopy images.

3. The method of claim 2, wherein converting the plurality of color microscopy images to the plurality of greyscale microscopy images further comprises using a Karhunen-Loeve transform to convert the images to greyscale.

4. The method of claim 1, further comprising:
performing, prior to applying the ensemble of segmentations to the plurality of greyscale images, screening of each of the plurality of greyscale images to determine if the pixel intensity of each of the plurality of greyscale images is acceptable; and
rejecting the greyscale images if the pixel intensity of the greyscale image is not acceptable.

5. The method of claim 1, wherein each of the segmentations of the ensemble of segmentations comprises a three-class Otsu thresholding algorithm.

6. The method of claim 1, wherein each of the segmentations of the ensemble of segmentations comprises at least one morphological operation.

7. The method of claim 1, wherein each of the segmentations of the ensemble of segmentations comprises a common algorithm having different parameter settings.

8. The method of claim 1, wherein each of the segmentations of the ensemble of segmentations comprises a different algorithm.

9. The method of claim 1, further comprising performing, prior to applying an ensemble of segmentations to the plurality of greyscale images, a connected component analysis to remove blobs from the greyscale images that are smaller than a predetermined minimum blob size.

10. The method of claim 1, wherein determining if a blob is present in at least half of the segmented images of the set of segmented images further comprises comparing the blobs of the segmented images based upon a colinearity criterion and an area overlap criterion.

11. The method of claim 1, wherein calculating the mean nuclear volume of the final image level segmentation further comprises applying stereological methods to obtain mean nuclear volume estimates of the blobs using a point-sampled intercept.

12. A method for determining if a tissue sample is representative of cancerous tissue, the method comprising:
receiving a plurality of color microscopy images of at least one stained tissue sample;
converting the plurality of color microscopy images to a plurality of greyscale microscopy images;
performing screening of each of the plurality of greyscale images to determine if the pixel intensity of each of the plurality of greyscale images is acceptable and rejecting the greyscale images if the pixel intensity of the greyscale image is not acceptable;
applying an ensemble of segmentations to a plurality of greyscale images to generate a set of segmented images for each of the plurality of greyscale images;
determining if a segmented image of the set of segmented images comprises a blob that is larger than a predetermined maximum blob size, and rejecting the set of segmented images if a segmented image of the set of segmented images comprises a blob that is larger than a predetermined maximum blob size;
determining if at least half of the segmented images of the set of segmented images are similar, rejecting the set of segmented images if at least half of the segmented images of the set of segmented images are not similar and accepting the set of segmented images if at least half of the segmented images of the set of segmented images are similar to generate a set of accepted image level segmented images;
determining if a blob is present in at least half of the segmented images of the set of segmented images, rejecting the set of segmented images if the blob is not present in at least half of the segmented images of the set of segmented images and accepting the set of segmented images if the blob is present in at least half of the segmented images of the set of segmented images to generate a set of accepted blob level segmented images;
combining the segmented images of the set of accepted image level segmented images using a consensus function to generate a final image level segmentation;
combining the segmented images of the set of accepted blob level segmented images using a consensus function to generate a final blob level segmentation; and
calculating the mean nuclear volume of the final image level segmentation and the final blob level segmentation to determine if the tissue sample is representative of cancerous tissue.

13. One or more non-transitory computer-readable media having computer-executable instructions for performing a method of running a software program on a computing device, the computing device operating under an operating system, the method including issuing instructions from the software program comprising:

applying an ensemble of segmentations to a plurality of greyscale images to generate a set of segmented images for each of the plurality of greyscale images;

determining if a segmented image of the set of segmented images comprises a blob that is larger than a predetermined maximum blob size, and rejecting the set of segmented images if a segmented image of the set of segmented images comprises a blob that is larger than a predetermined maximum blob size;

determining if at least half of the segmented images of the set of segmented images are similar, rejecting the set of segmented images if at least half of the segmented images of the set of segmented images are not similar and accepting the set of segmented images if at least half of the segmented images of the set of segmented images are similar to generate a set of accepted image level segmented images;

determining if a blob is present in at least half of the segmented images of the set of segmented images, rejecting the set of segmented images if the blob is not present in at least half of the segmented images of the set of segmented images and accepting the set of segmented images if the blob is present in at least half of the segmented images of the set of segmented images to generate a set of accepted blob level segmented images;

combining the segmented images of the set of accepted image level segmented images using a consensus function to generate a final image level segmentation;

combining the segmented images of the set of accepted blob level segmented images using a consensus function to generate a final blob level segmentation; and calculating the mean nuclear volume of the final image level segmentation and the final blob level segmentation to determine if the tissue sample is representative of cancerous tissue.

14. The media of claim 13 wherein instructions from the software program, further include:

receiving a plurality of color microscopy images of at least one stained tissue sample; and converting the plurality of color microscopy images to the plurality of greyscale microscopy images.

15. The media of claim 14, wherein converting the plurality of color microscopy images to the plurality of greyscale microscopy images further comprises using a Karhunen-Loeve transform to convert the images to greyscale.

16. The media of claim 13, wherein instructions from the software program, further include:

performing, prior to applying the ensemble of segmentations to the plurality of greyscale images, screening of each of the plurality of greyscale images to determine if the pixel intensity of each of the plurality of greyscale images is acceptable; and rejecting the greyscale images if the pixel intensity of the greyscale image is not acceptable.

17. The media of claim 13, wherein each of the segmentations of the ensemble of segmentations comprises a three-class Otsu thresholding algorithm.

18. The media of claim 13, wherein each of the segmentations of the ensemble of segmentations comprises at least one morphological operation.

19. The media of claim 13, wherein instructions from the software program, further include performing, prior to applying an ensemble of segmentations to the plurality of greyscale images, a connected component analysis to remove blobs from the greyscale images that are smaller than a predetermined minimum blob size.

20. The media of claim 13, wherein calculating the mean nuclear volume of the final image level segmentation further comprises applying stereological methods to obtain mean nuclear volume estimates of the blobs using a point-sampled intercept.

* * * * *